W. D. REHWALDT.
WATER GATE.
APPLICATION FILED MAR. 8, 1918.
1,269,855.
Patented June 18, 1918.
2 SHEETS—SHEET 2.
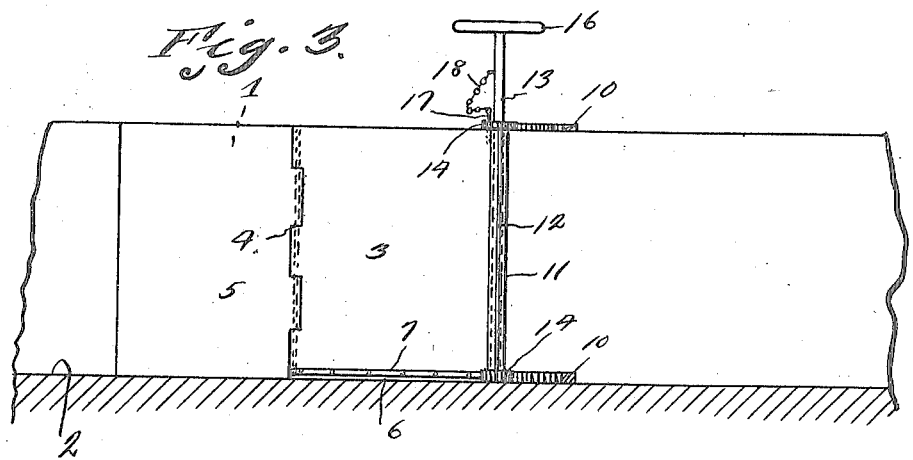
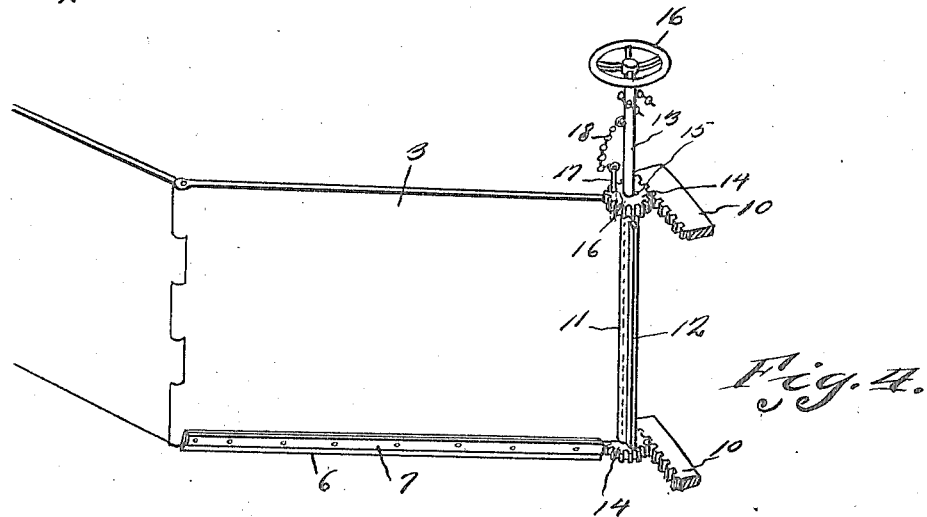

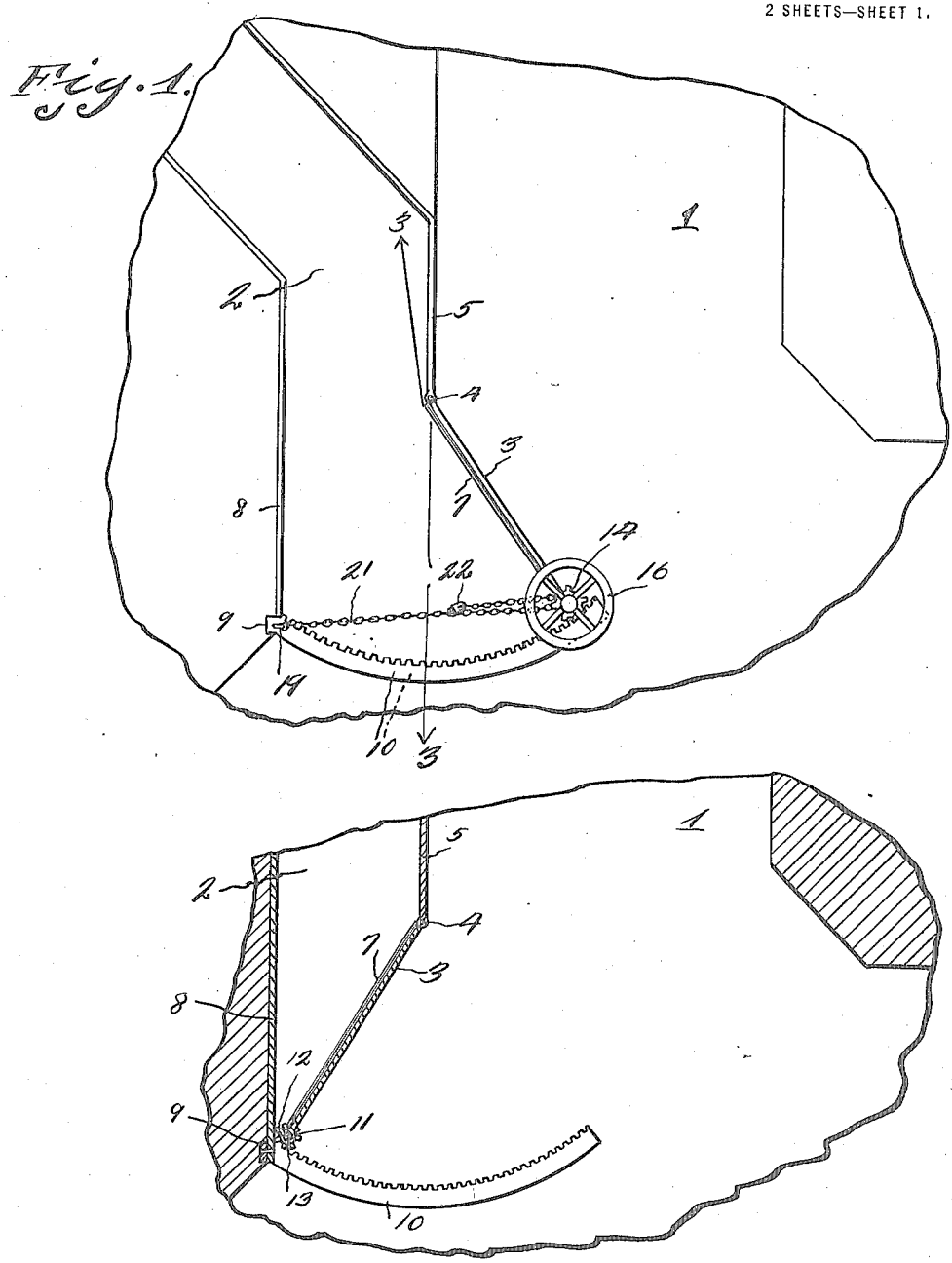

UNITED STATES PATENT OFFICE.

WILLIAM D. REHWALDT, OF GERMANIA, WYOMING.

WATER-GATE.

1,269,855. Specification of Letters Patent. Patented June 18, 1918.

Application filed March 8, 1918. Serial No. 221,212.

*To all whom it may concern:*

Be it known that I, WILLIAM D. REHWALDT, a citizen of the United States, residing at Germania, in the county of Bighorn, State of Wyoming, have invented a new and useful Water-Gate; and I do hereby declare the following to be a full, clear, and exact description of the invention, such as will enable others skilled in the art to which it appertains to make and use the same.

This invention relates to an improved water gate particularly adapted for irrigation canals, and the object of the invention is to provide a device of this kind, whereby a portion of the main body of water passing through the main canal may be deflected into branch channels or branch canals.

A further object of the invention is to provide a water gate having means for holding the same in different positions, whereby different quantities of water may be deflected from the main body of water.

A further object of the invention is to provide improved means for preventing the gate from being opened farther after once having been set.

In practical fields the details of construction may necessitate alterations falling within the scope of what is claimed.

The invention comprises further features and combination of parts as hereinafter set forth, shown in the drawings and claimed.

In the drawings:—

Figure 1 is a plan view of a main canal or channel and a branch channel, showing the water gate applied;

Fig. 2 is a plan view of a portion of the main channel and the branch channel showing parts thereof in section and showing the water gate in section and in a closed position;

Fig. 3 is a sectional view on line 3—3 of Fig. 1; and

Fig. 4 is a detail perspective view of the water gate.

Referring more especially to the drawings 1 designates the main canal or channel and 2 the branch canal or channel, and 3 denotes a water gate which has hinged connections 4 with a partition 5 between the main canal and the branch canal, which may extend to any suitable point for irrigating the surrounding land. A suitable rubber wiper 6 is fastened to the lower edge of the water gate between a holding strip 7 and the gate. This wiper is designed to wipe against the bottom of the canal, and when the gate is closed, act to make a close fit between the gate and the bottom of the branch canal, in order to prevent excessive leakage of water from the main canal through the branch canal. A wall plate 8 is fastened to a perpendicular strip 9, to form one of the sides of the branch canal. The upper and lower end of this strip 9 is provided with segmental curved racks 10, which extend laterally into the canal, as shown clearly in Figs. 1 and 2. The free end of the gate terminates in a perpendicular tubular portion 11, which has an abutment rib 12 to contact with the wall plate 8 when the gate is closed to assist in preventing leakage. Mounted in the tubular portion is a vertical shaft 13, the lower end and the upper part of which are provided with gears 14 which is keyed to the shaft as at 15. These gears 14 mesh with the teeth of the racks. The upper end of the shaft 13 has a hand wheel 16, and by manipulating the same and consequently turning the shaft, the gears in coöperating with the rack teeth will cause adjustment of the gate to different positions, either entirely open, closed, or to different partial open positions. The upper gear 14 has an aperture 16 for the reception of a pin 17. This pin is anchored to the shaft 13 by means of a chain 18. By inserting the pin through the gear as shown, so as to engage on one side of said gate as shown clearly in Figs. 3 and 4, the gate will be prevented from entirely closing or entirely opening, after once having been adjusted or set. An eye 19 is carried by the upper rack where it merges integrally into the strip 9. A chain 21 is connected to an eye 19, and the other end portion of the chain is looped once around the shaft 13, and its extremity is provided with a padlock or the like 22, adapted to be detachably connected to anyone of several links of the body of the chain, thereby preventing the case from being opened beyond a distance to which it has once been adjusted. After the gate has been set, as shown in Fig. 1 a portion of the main body of water passing through the canal or channel 1 will be deflected through the branch channel or canal 2 to any suitable location for irrigation purposes of the surrounding land.

The invention having been set forth what is claimed as new and useful is:—

1. In combination, a main canal having a branch canal, a partition between the main and branch canals, a pair of segment racks projecting from the far wall of the branch canal, a water gate hingedly connected to the partition, a shaft mounted perpendicular in a bearing of the free end of the gate and provided with gears engaging the teeth of said racks, said racks being disposed above and below the gate, and a handle wheel carried by the upper end of the shaft for operating the shaft for adjusting the gate.

2. In combination, a main canal having a branch canal, a partition between the main and branch canals, a pair of segment racks projecting from the far wall of the branch canal, a water gate hingedly connected to the partition, a shaft mounted perpendicular in a bearing of the free end of the gate and provided with gears engaging the teeth of said racks, said racks being disposed above and below the gate, and a handle wheel carried by the upper end of the shaft for operating the shaft for adjusting the gate, a pin passing through the upper gear and engaging said gate to prevent excessive displacement after the gate has once been adjusted, and means connecting one end of the uppermost rack and the hand wheel to prevent the gate from being opened beyond the distance to which it has once been adjusted.

In testimony whereof I have signed my name to this specification in the presence of two subscribing witnesses.

WILLIAM D. REHWALDT.

Witnesses:
HENRY MAYLAND,
HENRY POCHEKAERE.

Copies of this patent may be obtained for five cents each, by addressing the "Commissioner of Patents, Washington, D. C."